United States Patent
Kumar (10) Patent No.: US 8,734,726 B2
(45) Date of Patent: May 27, 2014

(54) MULTILAYER MOUNTING MAT FOR POLLUTION CONTROL DEVICES

(75) Inventor: Amit Kumar, Getzville, NY (US)

(73) Assignee: Unifrax I LLC, Tonawanda, NY (US)

( * ) Notice: Subject to any disclaimer, the term of this patent is extended or adjusted under 35 U.S.C. 154(b) by 319 days.

(21) Appl. No.: 12/968,873

(22) Filed: Dec. 15, 2010

(65) Prior Publication Data

US 2011/0150715 A1  Jun. 23, 2011

Related U.S. Application Data (60) Provisional application No. 61/287,235, filed on Dec. 17, 2009.

(51) Int. Cl.
  *B01D 50/00*  (2006.01)
(52) U.S. Cl.
  USPC .......................................................... 422/179
(58) Field of Classification Search
  CPC ... F01N 3/0211; F01N 3/2857; F01N 3/2853; F01N 3/2864; F01N 3/2867; F01N 2350/04; F01N 2350/06; Y02T 10/20
  USPC .......................................... 422/177, 179, 180
  See application file for complete search history.

(56) References Cited

U.S. PATENT DOCUMENTS

| | | | |
|---|---|---|---|
| 3,012,923 A | 12/1961 | Slayter | |
| 3,224,927 A | 12/1965 | Brown et al. | |
| 3,458,329 A | 7/1969 | Owens | |
| 3,510,394 A | 5/1970 | Cadotte | |
| 3,649,406 A | 3/1972 | McNish | |
| 3,674,621 A | 7/1972 | Miyamoto et al. | |
| 3,771,967 A | 11/1973 | Nowak | |
| 3,785,838 A | 1/1974 | Weidman | |
| 3,798,006 A | 3/1974 | Balluff | |
| 3,861,881 A | 1/1975 | Nowak | |
| 3,916,057 A | 10/1975 | Hatch et al. | |
| 3,957,573 A | 5/1976 | Miyamoto et al. | |
| 3,996,145 A | 12/1976 | Hepburn | |
| 4,011,651 A | 3/1977 | Bradbury et al. | |

(Continued)

FOREIGN PATENT DOCUMENTS

| | | |
|---|---|---|
| DE | 3925845 | 2/1991 |
| DE | 196 38 542 A1 | 3/1997 |

(Continued)

OTHER PUBLICATIONS

International Preliminary Report on Patentability, Form PCT/IB/373 for International Patent Application No. PCT/US2010/060493, Mailing Date Jun. 28, 2012.

(Continued)

*Primary Examiner* — Tom Duong
(74) *Attorney, Agent, or Firm* — Curatolo Sidoti Co., LPA; Joseph G. Curatola; Vincent A. Cortese (57) ABSTRACT

A multilayer mounting mat for an exhaust gas treatment device including high temperature resistant inorganic fibers, optionally organic binder, and optionally intumescent material. A plurality of the mounting mat plies contain a substantial proportion of the inorganic fibers oriented in the x-y plane of the mounting mat. An exhaust gas treatment device includes a housing, a fragile catalyst support structure resiliently mounted within the housing, and the multilayer mounting mat disposed in a gap between the housing and the fragile catalyst support structure.

17 Claims, 1 Drawing Sheet

(56) References Cited

U.S. PATENT DOCUMENTS

| | | | |
|---|---|---|---|
| 4,048,363 | A | 9/1977 | Langer et al. |
| 4,093,423 | A | 6/1978 | Neumann |
| 4,101,280 | A | 7/1978 | Frietzsche et al. |
| 4,142,864 | A | 3/1979 | Rosynsky et al. |
| 4,156,533 | A | 5/1979 | Close et al. |
| 4,204,907 | A | 5/1980 | Korklan et al. |
| 4,239,733 | A | 12/1980 | Foster et al. |
| 4,269,807 | A | 5/1981 | Bailey et al. |
| 4,269,887 | A | 5/1981 | Sonobe et al. |
| 4,271,228 | A | 6/1981 | Foster et al. |
| 4,279,864 | A | 7/1981 | Nara et al. |
| 4,305,992 | A | 12/1981 | Langer et al. |
| 4,328,187 | A | 5/1982 | Musall et al. |
| 4,332,852 | A | 6/1982 | Korklan et al. |
| 4,335,077 | A | 6/1982 | Santiago et al. |
| 4,353,872 | A | 10/1982 | Midorikawa |
| 4,385,135 | A | 5/1983 | Langer et al. |
| 4,447,345 | A | 5/1984 | Kummermehr et al. |
| 4,617,176 | A | 10/1986 | Merry |
| 4,693,338 | A | 9/1987 | Clerc |
| 4,735,757 | A | 4/1988 | Yamamoto et al. |
| 4,746,570 | A | 5/1988 | Suzaki et al. |
| 4,752,515 | A | 6/1988 | Hosoi et al. |
| 4,797,263 | A | 1/1989 | Oza |
| 4,823,845 | A | 4/1989 | Martin et al. |
| 4,849,382 | A | 7/1989 | Shibata et al. |
| 4,863,700 | A | 9/1989 | Ten Eyck |
| 4,865,818 | A | 9/1989 | Merry et al. |
| 4,927,608 | A | 5/1990 | Wörner et al. |
| 4,929,429 | A | 5/1990 | Merry |
| 4,985,212 | A | 1/1991 | Kawakami et al. |
| 4,999,168 | A | 3/1991 | Ten Eyck |
| 5,002,836 | A | 3/1991 | Dinwoodie et al. |
| 5,008,086 | A | 4/1991 | Merry |
| 5,032,441 | A | 7/1991 | Ten Eyck et al. |
| 5,073,432 | A | 12/1991 | Horikawa et al. |
| 5,079,280 | A | 1/1992 | Yang et al. |
| 5,094,073 | A | 3/1992 | Wörner et al. |
| 5,094,074 | A | 3/1992 | Nishizawa et al. |
| 5,119,551 | A | 6/1992 | Abbott |
| 5,139,615 | A | 8/1992 | Conner et al. |
| 5,145,811 | A | 9/1992 | Lintz et al. |
| 5,151,253 | A | 9/1992 | Merry et al. |
| 5,167,765 | A | 12/1992 | Nielsen et al. |
| 5,242,871 | A | 9/1993 | Hashimoto et al. |
| 5,250,269 | A | 10/1993 | Langer |
| 5,254,410 | A | 10/1993 | Langer et al. |
| 5,258,216 | A | 11/1993 | Von Bonin et al. |
| 5,290,350 | A | 3/1994 | Besnard et al. |
| 5,290,522 | A | 3/1994 | Rogers et al. |
| 5,332,609 | A | 7/1994 | Corn |
| 5,332,699 | A | 7/1994 | Olds et al. |
| 5,340,643 | A | 8/1994 | Ou et al. |
| 5,376,341 | A | 12/1994 | Gulati |
| 5,380,580 | A | 1/1995 | Rogers et al. |
| 5,384,188 | A | 1/1995 | Lebold et al. |
| 5,389,716 | A | 2/1995 | Graves |
| 5,419,975 | A | 5/1995 | Lintz et al. |
| 5,453,116 | A | 9/1995 | Fischer et al. |
| 5,482,686 | A | 1/1996 | Lebold et al. |
| 5,488,826 | A | 2/1996 | Paas |
| 5,502,937 | A | 4/1996 | Wilson |
| 5,523,059 | A | 6/1996 | Langer |
| 5,567,536 | A | 10/1996 | Lintz et al. |
| 5,580,532 | A | 12/1996 | Robinson et al. |
| 5,585,312 | A | 12/1996 | TenEyck et al. |
| 5,666,726 | A | 9/1997 | Robinson et al. |
| 5,714,421 | A | 2/1998 | Olds et al. |
| 5,736,109 | A | 4/1998 | Howorth et al. |
| 5,811,063 | A | 9/1998 | Robinson et al. |
| 5,811,360 | A | 9/1998 | Jubb |
| 5,821,183 | A | 10/1998 | Jubb |
| 5,853,675 | A | 12/1998 | Howorth |
| 5,862,590 | A | 1/1999 | Sakashita et al. |
| 5,869,010 | A | 2/1999 | Langer |
| 5,874,375 | A | 2/1999 | Zoitos et al. |
| 5,882,608 | A | 3/1999 | Sanocki et al. |
| 5,928,075 | A | 7/1999 | Miya et al. |
| 5,928,975 | A | 7/1999 | Jubb |
| 5,955,177 | A | 9/1999 | Sanocki et al. |
| 5,955,389 | A | 9/1999 | Jubb |
| 6,000,131 | A | 12/1999 | Schmitt |
| 6,025,288 | A | 2/2000 | Zoitos et al. |
| 6,030,910 | A | 2/2000 | Zoitos et al. |
| 6,051,193 | A | 4/2000 | Langer et al. |
| 6,092,622 | A * | 7/2000 | Hiers et al. ............... 181/290 |
| 6,101,714 | A | 8/2000 | Schmitt |
| 6,158,120 | A | 12/2000 | Foster et al. |
| 6,162,404 | A | 12/2000 | Tojo et al. |
| 6,183,852 | B1 | 2/2001 | Rorabaugh et al. |
| 6,231,818 | B1 | 5/2001 | TenEyck |
| 6,251,224 | B1 | 6/2001 | Dong |
| 6,267,843 | B1 | 7/2001 | Helwig et al. |
| 6,317,976 | B1 | 11/2001 | Aranda et al. |
| 6,468,932 | B1 | 10/2002 | Robin et al. |
| 6,589,488 | B1 | 7/2003 | Eyhorn |
| 6,726,884 | B1 | 4/2004 | Dillon et al. |
| 6,733,628 | B2 | 5/2004 | Dinwoodie et al. |
| 6,737,146 | B2 | 5/2004 | Schierz et al. |
| 6,756,107 | B1 | 6/2004 | Schierz et al. |
| 6,855,298 | B2 | 2/2005 | TenEyck |
| 6,861,381 | B1 | 3/2005 | Jubb et al. |
| 6,923,942 | B1 | 8/2005 | Shirk et al. |
| 6,953,757 | B2 | 10/2005 | Zoitos et al. |
| 6,987,076 | B1 | 1/2006 | Jubb et al. |
| 7,033,412 | B2 | 4/2006 | Kumar et al. |
| 7,153,796 | B2 | 12/2006 | Jubb et al. |
| 7,160,503 | B2 | 1/2007 | Weaver |
| 7,259,118 | B2 | 8/2007 | Jubb et al. |
| 7,261,864 | B2 | 8/2007 | Watanabe |
| 7,276,280 | B2 | 10/2007 | Dinwoodie et al. |
| 7,387,822 | B2 | 6/2008 | Dinwoodie |
| 7,442,347 | B2 | 10/2008 | Yoshimi et al. |
| 7,550,118 | B2 | 6/2009 | Merry |
| 7,820,117 | B2 | 10/2010 | Peisert et al. |
| 7,887,917 | B2 | 2/2011 | Zoitos et al. |
| 7,971,357 | B2 | 7/2011 | Ten Eyck et al. |
| 2001/0036427 | A1 | 11/2001 | Yamada et al. |
| 2002/0025750 | A1 | 2/2002 | Dinwoodie |
| 2002/0025904 | A1 | 2/2002 | Goto et al. |
| 2002/0127154 | A1 | 9/2002 | Foster et al. |
| 2003/0049180 | A1 | 3/2003 | Fukushima |
| 2003/0056861 | A1 | 3/2003 | Weaver |
| 2003/0185724 | A1 | 10/2003 | Anji et al. |
| 2004/0052694 | A1 | 3/2004 | Nishikawa et al. |
| 2004/0234436 | A1 | 11/2004 | Howorth |
| 2005/0272602 | A1 | 12/2005 | Ninomiya |
| 2006/0153746 | A1 | 7/2006 | Merry et al. |
| 2006/0154040 | A1 | 7/2006 | Merry |
| 2006/0278323 | A1 | 12/2006 | Eguchi |
| 2007/0065349 | A1 | 3/2007 | Merry |
| 2007/0207069 | A1 | 9/2007 | Kariya et al. |
| 2007/0218320 | A1 | 9/2007 | Weaver |
| 2008/0253939 | A1 | 10/2008 | Hornback |
| 2009/0022633 | A1 | 1/2009 | Tomosue et al. |
| 2009/0060800 | A1 | 3/2009 | Fernandes |
| 2009/0060802 | A1 * | 3/2009 | Beauharnois ............... 422/177 |
| 2009/0114097 | A1 | 5/2009 | Saiki |
| 2009/0162256 | A1 | 6/2009 | Ten Eyck et al. |
| 2010/0055004 | A1 | 3/2010 | Olson et al. |
| 2010/0207298 | A1 | 8/2010 | Kunze et al. |
| 2010/0209306 | A1 | 8/2010 | Kunze et al. |
| 2011/0094419 | A1 | 4/2011 | Fernando et al. |
| 2012/0100046 | A1 | 4/2012 | Kelsall et al. |

FOREIGN PATENT DOCUMENTS

| | | |
|---|---|---|
| DE | 199 57 692 A1 | 5/2001 |
| EP | 0 009 940 A1 | 4/1980 |
| EP | 0 205 704 A1 | 12/1986 |
| EP | 0 279 511 A2 | 8/1988 |
| EP | 0 319 299 A2 | 6/1989 |
| EP | 0 328 293 A1 | 8/1989 |
| EP | 0 363 911 A2 | 4/1990 |

(56) References Cited

FOREIGN PATENT DOCUMENTS

| | | |
|---|---|---|
| EP | 0 396 331 A1 | 11/1990 |
| EP | 0 398 130 A2 | 11/1990 |
| EP | 0 465 203 A1 | 1/1992 |
| EP | 0 508 751 A1 | 10/1992 |
| EP | 0 522 722 A1 | 1/1993 |
| EP | 0 551 532 A1 | 7/1993 |
| EP | 0 573 834 A1 | 12/1993 |
| EP | 0 643 204 A2 | 3/1995 |
| EP | 0 765 993 A1 | 4/1997 |
| EP | 0 803 643 A1 | 10/1997 |
| EP | 0 834 936 A1 | 4/1998 |
| EP | 1 267 048 A1 | 12/2002 |
| EP | 1336678 B1 | 10/2004 |
| EP | 1 495 807 A1 | 1/2005 |
| EP | 1 533 409 A1 | 5/2005 |
| EP | 1 696 110 A1 | 8/2006 |
| EP | 1 905 895 A1 | 6/2007 |
| EP | 1 830 043 A1 | 9/2007 |
| EP | 1 931 862 A1 | 6/2008 |
| EP | 1 950 035 A1 | 7/2008 |
| GB | 1 438 762 A | 6/1976 |
| GB | 1 438 784 A | 6/1976 |
| GB | 1 513 808 A | 6/1978 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | 4-83773 A | 3/1992 |
| JP | 6-272549 | 9/1994 |
| JP | 7-286514 | 10/1995 |
| JP | 2006/177368 A | 7/2006 |
| WO | WO 91/11498 A1 | 8/1991 |
| WO | WO 93/23245 | 11/1993 |
| WO | WO 94/24425 | 10/1994 |
| WO | WO 97/02413 | 1/1997 |
| WO | WO 97/32118 | 9/1997 |
| WO | WO 97/32118 A1 | 9/1997 |
| WO | WO 98/04404 | 2/1998 |
| WO | WO 99/23370 | 5/1999 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2004/031544 A2 | 4/2004 |
| WO | WO 2004/064996 | 8/2004 |
| WO | WO 2005/106222 | 11/2005 |
| WO | WO 2006/055188 | 5/2006 |
| WO | WO 2006/065534 | 6/2006 |
| WO | WO 2007/143437 | 12/2007 |
| WO | WO 2008/059249 | 5/2008 |
| WO | WO 2008/103525 A2 | 8/2008 |
| WO | WO 2008/154078 A1 | 12/2008 |
| WO | WO 2008/156942 A1 | 12/2008 |
| WO | WO 2011/067598 | 6/2011 |

OTHER PUBLICATIONS

International Search Report, Form PCT/ISA/210 and Written Opinion, Form PCT/ISA/237 for PCT International Patent Application No. PCT/US2010/060516, mailed Mar. 14, 2011.
Gulati, Ten Eyck & Lebold. "Durable Packaging Design for Cordierite Ceramic Catalysts for Motorcycle Application" Society of Automotive Engineers Meeting, Detroit, MI, Mar. 1, 1993
Maret, Gulati, Lambert & Zink. Systems Durability of a Ceramic Racetrack Converter. International Fuels and Lubricants Meeting, Toronto, Canada, Oct. 7-10, 1991.
English language abstract of DE 19858025; Publication Date: Jun. 21, 2000; Applicant: Aslgawo GmbH.
Tosa Shin'Ichi, et al., "The Development of Converter Canning Technology for Thin Wall Substrate." Honda R&D Tech. Rev., vol. 12, No. 1, pp. 175-182, Japan (2000).
Product Brochure—"There's More to it Than You Think. HDK—Pyrogenic Silica", Wacker Silicones, 6173/10.05/e, Oct. 2005.
Technical Data Sheet—"HDK N20 Pyrogenic Silica", Wacker Silicones, Version 1.0, Jun. 12, 2008.
International Search Report, Form PCT/ISA/210 mailed Mar. 30, 2011 for PCT International Patent Application No. PCT/US2010/060493.
Written Opinion, Form PCT/ISA/237 mailed Mar. 30, 2011 for PCT International Patent Application No. PCT/US2010/060493.

\* cited by examiner

MULTILAYER MOUNTING MAT FOR POLLUTION CONTROL DEVICES

This application claims the benefit of the filing date, under 35 U.S.C. §119(e), of U.S. Provisional Application Patent Ser. No. 61/287,235, filed on Dec. 17, 2009.

A mat is provided for use in an exhaust gas treatment device, such as catalytic converters and diesel particulate traps that are used in automotive exhaust systems. The mat may be used as a mounting mat to mount a fragile structure within an outer housing of an exhaust gas treatment device or as thermal insulation in an end cone of the exhaust gas treatment device. A device is also provided for the treatment of exhaust gases, such as a catalytic converter or a diesel particulate trap. The device may include a fragile structure mounted within a housing by a mounting mat that is disposed in a gap between the housing and the fragile structure, or may include the mat as thermal insulation in its end cone section.

Exhaust gas treatment devices are used on automobiles to reduce atmospheric pollution from engine emissions. Examples of widely used exhaust gas treatment devices include catalytic converters, diesel particulate traps and other pollution control devices.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

Another type of exhaust gas treatment device is a selective catalyst reduction unit; the active portion of a selective catalyst reduction unit comprises a fragile substrate, coated with a catalyst to promote chemical reduction and elimination of undesired products in the exhaust stream.

Another type of exhaust gas treatment device is a $NO_x$ trap; the active portion of a $NO_x$ trap comprises a fragile catalytic substrate comprising alkali or alkaline earth materials. The trap operates in a cyclic manner; cycling between a "sorption" process and a "regeneration" process. During sorption the substrate intakes $NO_x$ species and traps them on the surface of the catalytic substrate as nitrate species. During regeneration, a reducing material is introduced into the $NO_x$ trap and the nitrate species are removed from the substrate and reduced to nitrogen.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

The fragile structure generally comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

The mounting mat materials employed should be capable of satisfying any of a number of design or physical requirements set forth by the fragile structure manufacturers or the exhaust gas treatment device manufacturers. For example, the mounting mat material should be capable of exerting an effective residual holding pressure on the fragile structure, even when the exhaust gas treatment device has undergone wide temperature fluctuations, which causes significant expansion and contraction of the metal housing in relation to the fragile structure, which in turn causes significant compression and release cycles for the mounting mats over a period of time.

Ceramic and metallic substrates used in exhaust gas treatment devices are most often mounted within a metal housing with an inorganic fiber based mounting mat. This mounting mat material may contain only inorganic fibers. However, the mounting mat material may also contain other types of fibers, organic binders, inorganic fillers and/or intumescent materials.

The mounting mat must function across a wide range of operating temperatures to effectively hold the substrate in position. Substrates are subjected to axial forces acting on the substrate due to vibrations. The mounting mat also compensates for the fact that the metal housing expands more or less than the substrate itself. Various exhaust gas treatment devices operate throughout a temperature range of ambient conditions at about 20° C. to about 1200° C. Therefore, mounting mats must provide robust holding pressure performance across this wide temperature range.

A multilayer mounting mat for use in exhaust gas treatment device applications is provided. The mounting mat includes multiple plies comprising heat resistant inorganic fibers, and optionally an organic binder, typically adapted to be sacrificially burned out, wherein at least one, or a plurality of the mounting mat plies comprise a substantial proportion or majority of their inorganic fibers oriented in the x-y plane of the mounting mat. According to certain embodiments, at least one mounting mat ply may optionally include an intumescent material.

A device for treating exhaust gases is also provided. The device includes an outer metallic housing, at least one fragile structure that is mounted within the housing by a mounting mat that is disposed between the inner surface of the housing and the outer surface of the fragile structure. The term "fragile structure" is intended to mean and include structures such as metal or ceramic monoliths or the like which may be fragile or frangible in nature, and would benefit from a mounting mat such as is described herein.

Catalytic converter catalyst structures generally include one or more porous tubular or honeycomb-like structures mounted by a thermally resistant material within a housing. Each structure may include from about 200 to about 900 or more channels or cells per square inch, depending upon the type of exhaust gas treatment device. A diesel particulate trap differs from a catalytic converter structure in that each channel or cell within the particulate trap is closed at one end. Particulate is collected from exhaust gases in the porous structure until regenerated by a high temperature burnout process. Non-automotive applications for the mounting mat may include catalytic converters for chemical industry emission (exhaust) stacks.

Figure 1:
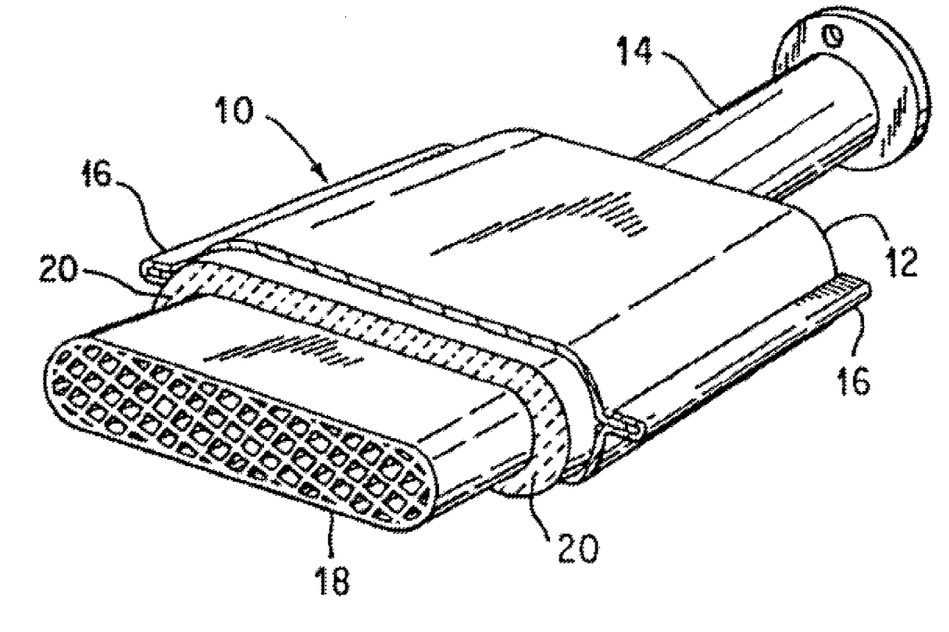
FIG. 1 shows a fragmentary view of an illustrative exhaust gas treatment device including the subject mounting mat.

One illustrative form of a device for treating exhaust gases is designated by the numeral 10 in FIG. 1. It should be understood that the mounting mat is not intended to be limited to use in the device shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, or the like.

According to certain illustrative embodiments, catalytic converter 10 may include a housing 12 formed of two pieces of metal, for example, high temperature resistant steel, held together by flange 16. Alternatively, the housing may include a preformed canister into which a mounting mat-wrapped fragile structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile structure, such as a frangible ceramic monolith 18, which is supported and restrained within housing 12 by a mounting mat 20. Monolith 18 includes a plurality of gas pervious passages that extend axially from its inlet at one end to its outlet at its opposite end. Monolith 18 may be constructed of any suitable refractory metal or ceramic material in any known manner and configuration. Monoliths are typically oval or round in cross-sectional configuration, but other shapes are possible.

The monolith is spaced from inner surfaces of the housing by a distance or a gap, which will vary according to the type and design of the device utilized, for example, a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the fragile structure, thereby protecting the fragile structure from mechanical shock across a wide range of exhaust gas treatment device operating temperatures.

In general, the mounting mat includes multiple plies comprising heat resistant inorganic fibers, and may include an organic binder optionally adapted to be sacrificially burned out, wherein at least one ply, or a plurality of the mounting mat plies, comprise a substantial proportion of the inorganic fibers oriented in the x-y plane of the mounting mat. The mounting mat 20 is capable of providing a holding pressure sufficient to resiliently hold the fragile catalyst support structure 18 within a housing 12 of an exhaust gas treatment device 10 throughout a wide temperature range.

Typically, wet laid intumescent or non-intumescent mats are produced as a single layer on a papermaking device, such as a rotoformer. It has been found that the performance or holding force of the mounting mat can be significantly improved if the mat is made of multiple plies, or layers, produced separately. For example, the performance of a single layer 1000 $g/m^2$ basis weight mounting mat can be improved by producing 10 layers at 100 $g/m^2$ basis weight each, and combining them to make a multi-ply mounting mat of 1000 $g/m^2$ (gsm) basis weight.

Wet laid mats are typically more uniform in basis weight and thickness distribution than dry laid mats. In a wet laid system, with the aid of high dilution levels and dispersing chemicals, a uniform sheet can be produced. However, when the mounting mat is produced as a single, thick layer of a given basis weight, a majority of fibers are oriented, or are laid up, in directions other than the desired x-y plane of the sheet. This phenomenon results in a reduction in the load bearing capacity of the mounting mat. By producing multiple thin layer sheets and combining them to achieve the target basis weight and thickness, the majority of the fibers can be forced to lie in the x-y plane, increasing the overall performance of the mounting mat product.

The orientation in which fibers are laid up inside the mounting mat affects the performance of the mat. Ideally, all fibers are oriented in the x-y plane of the mounting mat to maximize performance or holding pressure. To dispose all or most fibers in the x-y plane, the mat would theoretically need to be just 1 fiber thick, ensuring that there were no fibers crisscrossing vertically through the (thickness of the) mat structure. The thicker or heavier the mounting mat becomes, the more fibers are oriented in directions other than x-y plane. These fibers that are in other than the x-y plane orientation theoretically do not bear any load, and thus do not contribute to holding pressure. Typical non-intumescent mounting mats are about 1200 gsm or more. At that weight, the mats are 8 mm or more in thickness, and have many fibers oriented in directions other than the x-y plane of the mounting mat.

A process to achieve a large proportion of fibers oriented in the x-y plane in a thick and/or heavy mounting mat, includes producing individual thin plies or layers, and combining multiple layers to produce a mounting mat of the desired basis weight and/or thickness. In this way, a majority of the fibers would be oriented in the x-y plane or direction, providing a greater load bearing surface of fibers by decreasing the percentage of vertically oriented, non-weight bearing fibers. The resulting mounting mat would have a higher modulus and a much higher performance than a single layer mounting mat of the same basis weight and/or thickness.

In certain embodiments, the individual intumescent or non-intumescent fibrous plies or layers may have a thickness of about 3 mm each, and a basis weight of from about 30 to about 50 grams per square meter (gsm) each. After the individual plies are laid up or laminated and the stack of about 10 or more layers are processed, such as by needling (discussed below) by way of example and not of limitation, the resulting multi-layer mat may have a thickness of about 10 mm, and a basis weight of 1500 gsm.

The high temperature resistant inorganic fibers utilized in the subject mounting mat can withstand the mounting mat forming process, withstand the operating temperatures of the exhaust gas treatment devices, and provide the minimum holding pressure performance for holding fragile structure within the exhaust gas treatment device housing at the operating temperatures. Without limitation, suitable inorganic fibers that may be used to prepare the mounting mat and exhaust gas treatment device include high alumina polycrystalline fibers; mullite fibers; refractory ceramic fibers such as alumino-silicate fibers or kaolin fibers; alumina-zirconia-silica fibers; alumina-magnesia-silica fibers such as S-glass fibers or S2-glass fibers; chopped leached glass high silica fibers; biosoluble inorganic fibers, including but not limited to biosoluble alkaline earth silicate fibers such as calcia-magnesia-silica fibers or magnesia-silica fibers; or combinations thereof.

According to certain embodiments, the high temperature resistant inorganic fibers that are used to prepare the mounting mat comprise ceramic fibers comprising alumina. Without limitation, suitable ceramic fibers include alumina fibers, mullite fibers, alumino-silicate fibers, alumina-zirconia-silica fibers, and similar fibers. High alumina polycrystalline fibers may comprise the fiberization product of from about 72 to about 100 weight percent alumina and from 0 to about 28 weight percent silica. A suitable alumino-silicate ceramic fiber is commercially available from Unifrax I LLC (Niagara Falls, N.Y.) under the registered trademark FIBERFRAX. The FIBERFRAX® ceramic fibers comprise the fiberization product of a melt comprising from about 45 to about 75 weight percent alumina and from about 25 to about 55 weight percent silica. The FIBERFRAX® fibers exhibit operating temperatures of up to about 1540° C. and a melting point up to about 1870° C. The FIBERFRAX® fibers can be easily formed into high temperature resistant sheets and papers.

In certain embodiments, refractory ceramic fiber (RCF) such as alumino-silicate fiber may comprise from about 40 weight percent to about 60 weight percent $Al_2O_3$ and from about 60 weight percent to about 40 weight percent $SiO_2$, and in some embodiments, from about 47 to about 53 weight percent alumina and from about 47 to about 53 weight percent silica. The RCF fibers are a fiberization product that may be blown or spun from a melt of the component materials.

Alumina-zirconia-silica fibers comprise the fiberization product of alumina, silica and zirconia, in certain embodiments in the amounts of from about 29 to about 31 percent by weight alumina, from about 53 to about 55 percent by weight silica, and from about 15 to about 17 weight percent zirconia.

Alumina/silica/magnesia glass fiber typically comprises from about 64 weight percent to about 66 weight percent $SiO_2$, from about 24 weight percent to about 25 weight percent $Al_2O_3$, and from about 9 weight percent to about 11 weight percent MgO.

In certain embodiments, the mounting mat comprises melt-formed, amorphous, high-temperature resistant leached glass fibers having a high silica content. By the term "high silica content," it is meant that the fibers contain more silica than any other compositional ingredient in the fibers. In fact, the silica content of these fibers after leaching are typically greater than any other glass fibers containing silica, including S-glass fibers, except crystalline quartz derived fibers or pure silica fibers. In one embodiment, it will be appreciated that the mounting mat may be devoid of intumescent materials, sol gel-derived glass silica fibers and/or backing or reinforcing layers.

Generally, the leached glass fibers will have a silica content of at least 67 percent by weight. In certain embodiments, the leached glass fibers contains at least 90 percent by weight, and in certain of these, from about 90 percent by weight to less than 99 percent by weight silica. The average fiber diameter of these leached glass fibers may be greater than at least about 3.5 microns, and often greater than at least about 5 microns. On average, the glass fibers typically have a diameter of about 9 microns, up to about 14 microns.

Examples of leached glass fibers high in silica content and suitable for use in the production of a mounting mat for a catalytic converter or other known exhaust gas-treatment device include those leached glass fibers available from BelChem Fiber Materials GmbH, Germany, under the trademark BELCOTEX and from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free and binder free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

Suitable high temperature resistant biosoluble inorganic fibers that may be used include, without limitation, alkaline earth silicate fibers, such as calcia-magnesia-silicate fibers or magnesia-silicate fibers, calcia-aluminate fibers, potassia-calcia-aluminate fibers, potassia-alumina-silicate fibers, or sodia-alumina-silicate fibers.

The term "biosoluble" inorganic fibers refer to inorganic fibers that are soluble or otherwise decomposable in a physiological medium or in a simulated physiological medium, such as simulated lung fluid, saline solutions, buffered saline solutions, or the like. The solubility of the fibers may be evaluated by measuring the solubility of the fibers in a simulated physiological medium over time. Biosolubility can also be estimated by observing the effects of direct implantation of the fibers in test animals or by the examination of animals or humans that have been exposed to fibers, i.e. biopersistence.

A method for measuring the biosolubility (i.e. the non-durability) of the fibers in physiological media is disclosed in U.S. Pat. No. 5,874,375 assigned to Unifrax I LLC, and which is incorporated herein by reference. Other methods are suitable for evaluating the biosolubility of inorganic fibers. According to certain embodiments, the biosoluble fibers exhibit a solubility of at least 30 ng/cm²-hr when exposed as a 0.1 g sample to a 0.3 ml/min flow of simulated lung fluid at 37° C. According to other embodiments, the biosoluble inorganic fibers may exhibit a solubility of at least 50 ng/cm²-hr, or at least 100 ng/cm²-hr, or at least 1000 ng/cm²-hr when exposed as a 0.1 g sample to a 0.3 ml/min flow of simulated lung fluid at 37° C.

Another approach to estimating the biosolubility of fibers is based on the composition of the fibers. For example, Germany classifies respirable inorganic oxide fibers based on a compositional index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of from about 60 to about 90 weight percent silica, from greater than 0 to about 35 weight percent magnesia and 5 weight percent or less impurities. According to certain embodiments, the alkaline earth silicate fibers comprise the fiberization product of from about 65 to about 86 weight percent silica, from about 14 to about 35 weight percent magnesia and 5 weight percent or less impurities. According to other embodiments, the alkaline earth silicate fibers comprise the fiberization product of from about 70 to about 86 weight percent silica, from about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX (ft) fibers generally comprise the fiberization product of from about 70 to about 80 weight percent silica, from about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of from about 45 to about 90 weight percent silica, from greater than 0 to about 45 weight percent calcia, from greater than 0 to about 35 weight percent magnesia, and 10 weight percent or less impurities. In certain embodiments, biosoluble calcia-magnesia-silica fibers comprise from about 15% to about 35% CaO, from about 2.5% to about 20% MgO, and from about 60% to about 70% $SiO_2$.

Useful calcia-magnesia-silicate fibers are commercially available from Unifrax I LLC (Niagara Falls, N.Y.) under the registered trademark INSULFRAX. INSULFRAX® fibers generally comprise the fiberization product of from about 61 to about 67 weight percent silica, from about 27 to about 33 weight percent calcia, and from about 2 to about 7 weight percent magnesia. Other suitable calcia-magnesia-silicate bers are commercially available from Thermal Ceramics (Augusta, Ga.) under the trade designations SUPERWOOL, 607, SUPERW001, 607 MAX and SUPERWOOL HT. SUPERWOOL® 607 fibers comprise from about 60 to about 70 weight percent silica, from about 25 to about 35 weight percent calcia, and from about 4 to about 7 weight percent magnesia, and trace amounts of alumina. SUPERWOOL® 607 MAX fibers comprise from about 60 to about 70 weight percent silica, from about 16 to about 22 weight percent calcia, and from about 12 to about 19 weight percent magnesia, and trace amounts of alumina. SUPERWOOL® HT fibers comprise from about 74 weight percent silica, from about 24 weight percent calcia and trace amounts of magnesia, alumina and iron oxide.

According to certain embodiments, the biosoluble alkaline earth silicate fibers may comprise the fiberization product of a mixture of oxides of calcium and aluminum. According to certain embodiments, at least 90 weight percent of the calcia-aluminate fibers comprise the fiberization product of from about 50 to about 80 weight percent calcia, from about 20 to less than 50 weight percent alumina, and 10 weight or less percent impurities. According to other embodiments, at least 90 weight percent of the calcia-aluminate fibers comprise the fiberization product of from about 50 to about 80 weight percent alumina, from about 20 to less than 50 weight percent calcia, and 10 weight percent or less impurities.

According to certain embodiments, the biosoluble alkaline earth silicate fibers may comprise the fiberization product of a mixture of oxides of potassium, calcium and aluminum. According to certain embodiments, the potassia-calcia-aluminate fibers comprise the fiberization product of from about 10 to about 50 weight percent calcia, from about 50 to about 90 weight percent alumina, from greater than 0 to about 10 weight percent potassia, and 10 weight percent or less impurities.

The biosoluble fibers are typically amorphous inorganic or glass fibers that may be melt-formed, are fibers of high chemical purity (greater than about 98%) and may have an average diameter in the range of from about 1 μm to about 10 μl, and in certain embodiments, in the range of from about 2 μm to about 4 μm. While not specifically required, the fibers may be beneficiated, as is well known in the art.

The intumescent material that may optionally be incorporated into the mounting mat may include, without limitation, unexpanded vermiculite, ion-exchanged vermiculite, heat treated vermiculite, expandable graphite, hydrobiotite, water-swelling tetrasilicic flourine mica, alkaline metal silicates, or mixtures thereof. The intumescent material may be present in the mounting mat in the amount of from about 10% to about 60% by weight of the final mat. The mounting mat may include a mixture of more than one type of intumescent material. The intumescent material may comprise a mixture of unexpanded vermiculite and expandable graphite in a relative amount of from about 9:1 to about 1:2 vermiculite:graphite, as described in U.S. Pat. No. 5,384,188.

In some embodiments, the mounting mat may comprise a substantially non-expanding multilayer sheet of high temperature resistant inorganic fibers and optionally a binder. By "substantially non-expanding" is meant that the sheet does not readily expand upon the application of heat as would be expected with an intumescent sheet or paper. Of course, some expansion of the sheet does occur based upon its thermal coefficient of expansion. The amount of expansion, however, is insubstantial as compared to the expansion which occurs based upon intumescent properties. It will be appreciated that this type of mounting mat may be substantially devoid of intumescent materials.

The mounting mat comprise one or more organic binders. The organic binders may be provided as a solid such as a binder powder, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, and the like. Other resins include low temperature, flexible thermosetting resins such as unsaturated polyesters, epoxy resins and polyvinyl esters.

The organic binder may be included in the mounting mat in an amount of from greater than 0 to about 20 weight percent, in certain embodiments from about 0.5 to about 15 weight percent, in other embodiments from about 1 to about 10 weight percent and in some embodiments from about 2 to about 8 weight percent, based on the total weight of the mounting mat.

The mounting mat may include polymeric binder fibers instead of, or in addition to, a resinous or liquid binder. These polymeric binder fibers may be used in amounts ranging from greater than 0 to about 20 percent by weight, in certain embodiments from about 1 to about 15 weight percent, and in other embodiments from about 2 to about 10 weight percent, based upon the total weight of the mounting mat, to aid in binding the heat resistant inorganic fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

Typically, the organic binder is a sacrificial binder employed to initially bond the fibers together. By "sacrificial, " it is meant that the organic binder will eventually be burned out of the mounting mat as the temperature of the mounting mat increases towards operating temperatures, leaving the inorganic fibers, and optionally intumescent material as components of the mounting mat for supporting the fragile structure within the metallic housing.

Solvents for the binders can include water, or a suitable organic solvent, such as acetone. Solution strength of the binder in the solvent (if used) can be determined by conventional methods based on the binder loading desired and the workability of the binder system (viscosity, solids content, etc.).

In certain embodiments, the multilayer mounting mat may further comprise at least one of colloidal silica, colloidal alumina, colloidal zirconia, or combinations thereof. The colloidal inorganic oxide may be added to the mounting mat in an amount from about 0.1 weight percent to about 10 weight percent, based on the total weight of the mounting mat.

The mounting mat material may be produced in any way known in the art for forming sheet-like materials. For example, conventional paper-making processes, either hand laid or machine laid, may be used to prepare the sheet material. A handsheet mold, a Fourdrinier paper machine, or a rotoformer paper machine can be employed to make the sheet material.

For example, using a papermaking process, the inorganic fibers, organic binder, and optionally intumescent material, may be mixed together to form a mixture or slurry. The fibrous components may be mixed at a consistency or solids content of from about 0.25% to about 5% (0.25-5 parts solids to 99.75-95 parts water). The slurry of components may be diluted with water to enhance formation, and may be flocculated by adding a flocculating agent and drainage retention aid chemicals and optionally other additives to the slurry. The flocculated mixture or slurry is placed onto a papermaking machine to be formed into a ply or sheet of fiber containing paper. A stack of multiple wet plies or sheets are then dried, such as by air drying or oven drying. For a more detailed description of standard papermaking techniques employed, see U.S. Pat. No. 3,458,329, the disclosure of which is incorporated herein by reference.

Alternatively, the plies or sheets may be formed by vacuum casting the slurry. According to this method, the slurry of components is wet laid onto a pervious web. A vacuum is applied to the web to extract the majority of the moisture from the slurry, thereby forming a wet ply or sheet. A stack of multiple wet plies or sheets are then dried, typically in an oven. The stack of plies or sheets may be passed through a set of rollers to compress the stack prior to or after drying.

In one embodiment of the process for making the subject mounting mat, a ply or layer comprising the high temperature resistant fibers, optionally organic binder and optionally intumescent material, is wet-laid on a rotoformer, and multiple plies or layers of the still wet paper or sheet are stacked and processed through a "needier", prior to being fed through a drying oven. This process may include needle punching the fibers so as to intertwine and entangle a portion of them, while still wet with the aqueous paper-making solution or slurry, prior to drying the sheet. The resulting mounting mat is therefore strengthened as compared to prior art mounting mats of similar thickness and density.

In typical fiber needling operations (usually immediately after the liberizing step), a lubricating liquid (normally an oil or other lubricating organic material) is used to prevent fiber breakage and to aid in fiber movement and entanglement. In one embodiment of the process, the water from the wet-forming, paper-making process may be used to aid the process of needling. Alternatively, the wet laid sheets may be dried prior to the needling process.

By needling, it is meant any operation that will cause a portion of fibers to be displaced from their orientation within the paper or sheet, and extend for some length between the opposing surfaces of the paper or sheet. A needling apparatus typically includes a horizontal surface on which a web of fibers is laid or moves, and a needle board which carries an array of downwardly extending needles. The needle board reciprocates the needles into, and out of, the web, and reorients some of the fibers of the web into planes substantially transverse to the surfaces of the web. The needles can push fibers through the web from one direction, or for example, by use of barbs on the needles, can both push fibers from the top and pull fibers from the bottom of the web. There is typically provided physical entanglement of a minor portion of the fibers by full or partial penetration of the fiber paper or sheet by the barbed needles.

Additionally or alternatively, hydro-entangling methods may be used to intertwine and entangle the fibers. In a hydro-entanglement process, small, high intensity jets of water are impinged on a layer or sheet of loose fibers, with the fibers being supported on a perforated surface, such as a wire screen or perforated drum. The liquid jets cause the fibers, being relatively short and having loose ends, to become rearranged, with at least some portions of the fibers becoming physically entangled, wrapped, and/or intertwined around each other.

After the needling or hydro-entangling of the still wet paper or vacuum-cast mat, the mat may optionally be pressed, and is dried in an oven, for example but not limitation, at about 80° C. to about 700° C.

The wet needling step allows even brittle fiber to be woven without significant breakage. The wet needling further provides high strength, even after the organic binder has been burned out, such as in the initial operation of the vehicle, which results in the mat remaining durable even under vibration conditions experienced by an automotive exhaust system.

It is noted that single mounting mat plies may be too low in density for easy use in certain applications. Therefore, they may undergo further densification involving stacking the thin plies and processing by any manner known in the art to provide a higher density. One such manner of densification as discussed above is to needle punch the fibers so as to intertwine and entangle a portion of the fibers. Additionally or alternatively, hydro-entangling methods may be used, as discussed in detail hereinabove. Another alternative is to press the fibers into a mat form by rolling them through press rollers. Any of these methods of densification of the multi-ply mats or a combination of these methods can be readily used to obtain a mounting mat of the correct and desired form.

Regardless of which of the above-described techniques are employed, the composite can be cut, such as by die stamping, to form mounting mats of exact shapes and sizes with reproducible tolerances. The mounting mat 20 exhibits suitable handling properties upon densification, such as by needling or the like, meaning it can be easily handled and is not so brittle as to crumble in one's hand like many other fiber blankets or mats. It can be easily and flexibly fitted or wrapped around the fragile structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

The following examples are set forth merely to further illustrate the mounting mat and exhaust gas treatment device.

The illustrative examples should not be construed as limiting the mounting mat, exhaust gas treatment device incorporating the mounting mat, or the methods of making the mounting mat or the exhaust gas treatment device in any manner.

COMPARATIVE EXAMPLE 1

Using a handsheet mold, a 1600 gsm single layer of mounting mat was produced. The mat was made up primarily of RCF and a minor amount of organic binder. The handsheet was dried and then pressed to a target thickness of 9 mm. The target thickness gave the mat a density of approximately 180 kg/m$^3$.

EXAMPLE 2

Using a handsheet mold, 10 sheets of mounting mat at 160 gsm each were produced. Every sheet was made up primarily of RCF and a minor amount of organic binder fiber. The ten handsheets were dried and pressed together to form a 1600 gsm multilayer mat at the target thickness of Example 1. The target thickness gave the multilayer mat a density of approximately 180 kg/m$^3$.

EXAMPLE 3

Using a rotoformer, two 725 gsm sheets were produced. The sheets were made primarily of RCF and a minor amount of additional high temperature resistant inorganic fiber. The two sheets were then combined and densified using needle punching. After needle punching the multilayer mat was calcined and mechanically rolled down to a target thickness of 8.5 mm. The target thickness gave mat a density of 172 kg/m$^3$.

EXAMPLE 4

Using a rotolormer, four 350 gsm sheets were produced. The sheets were made primarily of RCF and a minor amount of additional high temperature resistant inorganic fiber. The four sheets were then combined and densified using needle punching. After needle punching the multilayer mat was calcined and mechanically rolled down to target thickness of Example 3. The target thickness gave the multilayer mat a density of 172 kg/m$^3$.

EXAMPLE 5

Using a rotoformer, eight 175 gsm sheets were produced. The sheets were made primarily of RCF and a minor amount of additional high temperature resistant inorganic fiber. The eight sheets were then combined and densified using needle punching. After needle punching, the multilayer mat was calcined and mechanically rolled down to the target thickness of Example 3. The target thickness gave the multilayer mat a density of 172 kg/m$^3$.

Testing

The various samples produced as described in the above examples were tested for performance using a 1000 cycle test. The tests were performed for 1000 mechanical cycles of a standard 1000 cycle gap expansion test conducted at a hot face temperature of 900° C. and a cold face temperature of 550° C. The gap expansion was maintained at 8% and the test mat gap bulk density was 0.3 g/cm$^3$.

By the term "cycle" it is meant that the gap between the monolith (i.e., fragile structure) and housing is opened and closed over a specific distance and at a predetermined rate. In order to simulate realistic conditions, the expansion of the gap between a housing and a fragile structure of a given diameter may be determined by calculating the coefficient of thermal expansion of a conventional housing at a temperature of for example, about 900° C. A final mat basis weight is then selected that will meet the criteria of the test, and provide a target minimum holding force after 1000 cycles. It will be appreciated that one of ordinary skill in the art will be able to conduct this 1000 cycle test employing these parameters without undue experimentation. That is, the above set parameters will enable one of ordinary skill in the art to make a like comparison of the effective holding pressure of a mat regardless of the characteristics of the mat or the size of the gap.

The minimum holding pressure of each of the examples after 1000 cycles is reported in Table 1 below.

TABLE 1

| Comparative Example 1 | (Single Layer) | 13.6 kPa |
| --- | --- | --- |
| Example 2 | (10 Layers) | 17.8 kPa |
| Example 3 | (2 Layers) | 28 kPa |
| Example 4 | (4 Layers) | 36 kPa |
| Example 5 | (8 Layers) | 40 kPa |

The multilayer mat of Example 2, having an increased proportion of fibers oriented in the x-y plane of the mat, demonstrated an increase of holding pressure of 30% over the single layer mounting mat of Comparative Example 1. Increasing the number of mat plies, which have an increased proportion of fibers oriented in the x-y plane of the mat, while maintaining the target thickness of a corresponding single ply mat, demonstrated an increase of 20-30% in holding pressure for the multilayer mats of Examples 3-5.

These mats are advantageous to the catalytic converter and diesel particulate trap industry. The mounting mats can be die cut and are operable as resilient supports in a thin profile, providing ease of handling, and in a flexible form, so as to be able to provide a total wrap of the catalyst support structure, if desired, without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperature, including during thermal cycling.

The subject mounting mat material described above may be used as end cone insulation in an exhaust gas treatment device. According to certain embodiments, an end cone for an exhaust gas treatment device is provided. The end cone generally comprises an outer metallic cone, an inner metallic cone and end cone insulation that is disposed within the gap or space between the outer and inner metallic end cones.

According to other embodiments, the end cone may comprise an outer metallic cone and at least one layer of cone insulation that is positioned adjacent to the inner surface of the outer metallic cone. According to these embodiments, the end cone assembly is not provided with an inner metallic cone. Rather, the cone insulation is rigidized in a known manner to provide a self-supporting cone structure that is resistant to the high temperature gases flowing through the device.

An exhaust gas treatment device including at least one end cone is provided. The exhaust gas treatment device may comprise a housing, a fragile structure positioned within the housing, an inlet and an outlet end cone assembly for attaching exhaust pipes to the housing, each end cone assembly comprising an inner end cone housing, an outer end cone housing, and end cone insulation. The subject multilayer mounting mat may be disposed as end cone insulation, positioned between the inner and outer cone housings of the double walled end cone assemblies of an exhaust gas treatment device.

The mounting mats described above can also be used in catalytic converters employed in the chemical industry which are located within exhaust or emission stacks, including those which contain fragile honeycomb type structures that need to be protectively mounted.

While the mounting mat and exhaust gas treatment device have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the mounting mat and exhaust gas treatment device should not be limited to any single embodiment, but rather construed in breadth and scope in accordance with the recitation of the appended claims.

The invention claimed is:

1. A multilayer mounting mat for an exhaust gas treatment device comprising:
   high temperature resistant inorganic fibers;
   optionally organic binder; and
   optionally an intumescent material;
   wherein the mat is formed from multiple plies of wet laid fibrous sheets;
   wherein the majority of fibers in each of a plurality of the multiple plies of wet laid fibrous sheets are oriented within the x-y plane of each such fibrous sheet; and
   wherein a minor portion of the fibers are physically entangled within the multilayer mounting mat by at least one of wet-needling, dry-needling, hydro-entanglement or pressing.

2. The multilayer mounting mat of claim 1, wherein the inorganic fibers are at least one of high alumina polycrystalline fibers, refractory ceramic fibers, mullite fibers, alumina-zirconia-silica fibers, alumina-magnesia-silica fibers, glass fibers, high temperature resistant biosoluble fibers, leached glass silica fibers, or combinations thereof.

3. The multilayer mounting mat of claim 2, wherein the high alumina polycrystalline fibers comprise the fiberization product of from about 72 to about 100 weight percent alumina and from about 0 to about 28 weight percent silica.

4. The multilayer mounting mat of claim 2, wherein the refractory ceramic fibers comprise alumino-silicate fibers comprising the fiberization product of from about 45 to about 75 weight percent alumina and from about 25 to about 55 weight percent silica.

5. The multilayer mounting mat of claim 2, wherein the biosoluble fibers comprise magnesia-silica fibers comprising the fiberization product of from about 65 to about 86 weight percent silica, from about 14 to about 35 weight percent magnesia and about 5 weight percent or less impurities.

6. The multilayer mounting mat of claim 2, wherein the biosoluble fibers comprise calcia-magnesia-silica fibers comprising the fiberization product of from about 45 to about 90 weight percent silica, from greater than 0 to about 45 weight percent calcia, and from greater than 0 to about 35 weight percent magnesia.

7. The multilayer mounting mat of claim 1, wherein the intumescent material is at least one of unexpanded vermiculite, ion exchanged vermiculite, heat treated vermiculite, expandable graphite, hydrobiotite, water-swelling tetrasilicic flourine mica, alkaline metal silicates, or mixtures thereof.

8. The multilayer mounting mat of claim 7, wherein the intumescent material comprises unexpanded vermiculite.

9. The multilayer mounting mat of claim 1, wherein the organic binder comprises at least one of acrylic latex, (meth) acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins and polyvinyl esters, and mixtures thereof.

10. The multilayer mounting mat of claim 1, wherein the organic binder comprises at least one of polyvinyl alcohol fibers, polyolefin fibers, polyethylene fibers, polypropylene fibers, acrylic fibers, polyester fibers, ethyl vinyl acetate fibers, nylon fibers, and combinations thereof.

11. The multilayer mounting mat of claim 1, further comprising at least one of colloidal silica, colloidal alumina, colloidal zirconia, or combinations thereof.

12. A process for producing the multilayer mounting mat of claim 1 comprising preparing a wet paper or sheet comprising the high temperature resistant fibers, optionally an organic binders and optionally intumescent material; stacking multiple plies of the wet paper or sheet together, and intertwining or entangling a portion of the fibers between plies within the stack of wet paper or sheet plies prior to drying.

13. The process of claim 12 wherein said intertwining or entangling comprises at least one of needle punching or hydro-entangling the stack of wet paper or sheet plies.

14. An exhaust gas treatment device comprising:
   a housing;
   a fragile structure resiliently mounted within the housing; and
a mounting mat disposed in a gap between the housing and the fragile structure, wherein the mounting mat is defined in claim 1.

15. The exhaust gas treatment device of claim 14, wherein the device is a catalytic converter or diesel particulate trap.

16. An end cone for an exhaust gas treatment device comprising:
   an outer metallic cone;
   an inner metallic cone; and
   cone insulation disposed between said outer and inner metallic end cones, said cone insulation comprising:
      high temperature resistant inorganic fibers;
      optionally organic binder; and
      optionally an intumescent material;
   wherein the cone insulation is formed from multiple plies of wet laid fibrous sheets;
   wherein the majority of fibers in each of a plurality of the multiple plies of wet laid fibrous sheets are oriented within the x-y plane of each such fibrous sheet; and
   wherein a minor portion of the fibers are physically entangled within the cone insulation by at least one of wet-needling, dry-needling, hydro-entanglement or pressing.

17. An end cone for an exhaust gas treatment device comprising:

an outer metallic cone; and
self-supporting cone insulation comprising:
   high temperature resistant inorganic fibers;
   optionally organic binder; and
   optionally an intumescent material;
wherein the cone insulation is formed from multiple plies of wet laid fibrous sheets;
wherein the majority of fibers in each of a plurality of the multiple plies of wet laid fibrous sheets are oriented within the x-y plane of each such fibrous sheet;
wherein the cone insulation is disposed adjacent to the inner surface of said outer metallic end cone; and
wherein a minor portion of the fibers are physically entangled within the cone insulation by at least one of wet-needling, dry-needling, hydro-entanglement or pressing.

* * * * *